United States Patent [19]
Roebke et al.

[11] 3,894,964
[45] July 15, 1975

[54] PROCESS FOR THE PREPARATION OF MOLECULAR SIEVE-SHAPED BODIES

[75] Inventors: Wolfgang Roebke, Bruchkobel; Eugen Meyer-Simon, Frankfurt; Dieter Kneitel; Erfried Parr, both of Rodenbach, all of Germany

[73] Assignee: Deutsche Gold- und Silber-Scheideanstalt vormals Roessler, Germany

[22] Filed: July 6, 1973

[21] Appl. No.: 377,103

[30] Foreign Application Priority Data
July 6, 1972 Germany.............................. 2233070

[52] U.S. Cl. ............................. 252/448; 252/455 Z
[51] Int. Cl. ........................ B01j 11/44; B01j 11/40
[58] Field of Search ........................ 252/448, 455 Z

[56] References Cited
UNITED STATES PATENTS

| | | | |
|---|---|---|---|
| 3,264,069 | 8/1966 | Getty | 252/448 X |
| 3,296,151 | 1/1967 | Heinze et al. | 252/448 |
| 3,433,587 | 3/1969 | Haden, Jr. et al. | 252/448 X |

*Primary Examiner*—C. Dees
*Attorney, Agent, or Firm*—Cushman, Darby & Cushman

[57] ABSTRACT

Shaped bodies of a molecular sieve zeolite having an improved mechanical hardness greater than 5 kp are produced by spraying an unstable silicic acid sol as the binder on to a zone of the rotating plate of a granulating device and concurrently applying the pulverized zeolite particles to another zone of the rotating plate, while avoiding the formation of a plastic mass, and the thus produced shaped bodies are dried and activated according to the disclosed process. The unstable silicic acid sol has a silicic acid content greater than 10 percent by weight and a BET surface greater than 150 $m^2/g$.

3 Claims, 2 Drawing Figures

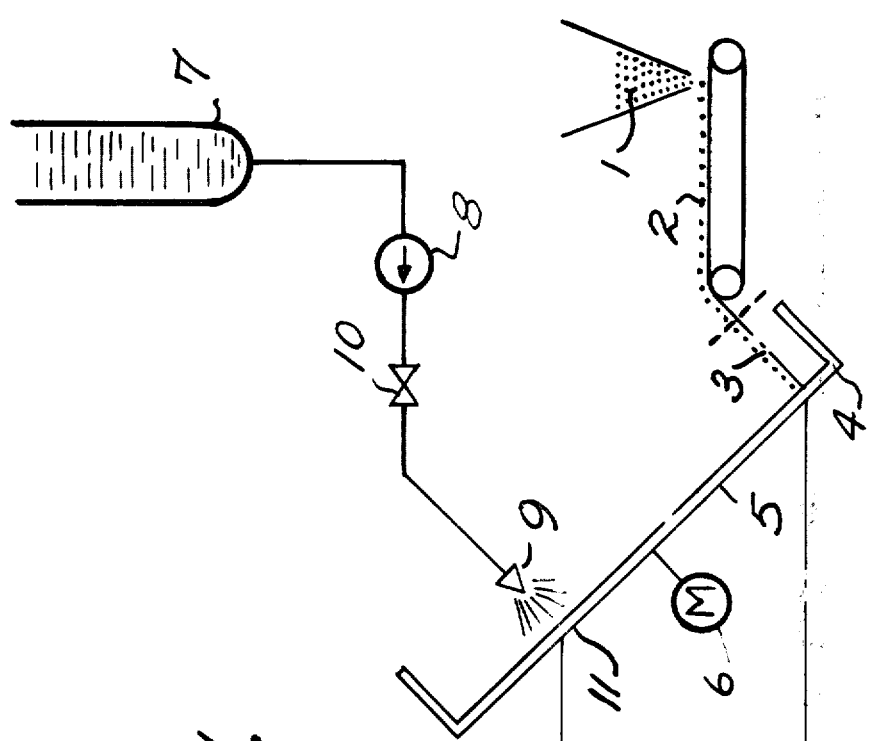
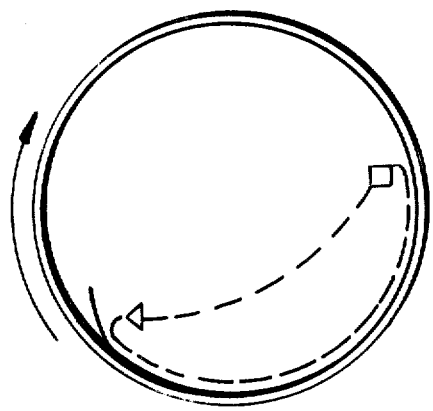
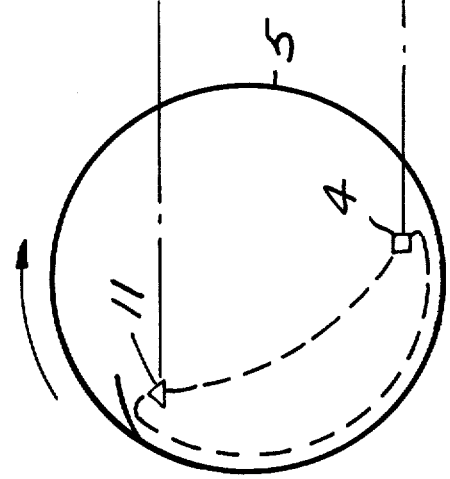
Fig. 1.
Fig. 2.

PROCESS FOR THE PREPARATION OF MOLECULAR SIEVE-SHAPED BODIES

BACKGROUND OF THE INVENTION

The present invention relates to a process for the preparation of mechanically resistant shaped bodies of pulverulent zeolitic molecular sieves with a water content that does not prevent trickling, with an average compression strength of more than 5 kp with use of silicic acid gel as a binder.

As is known zeolitic molecular sieves occur as crystals with a size between $0.1\mu$ and $10\mu$ as produced by synthesis from silicic acid, alumina and alkali according to known techniques. If these zeolites are used in separating columns or drying towers, it is necessary to prepare mechanically resistant shaped bodies from them. Since the usual granulation methods for preparation of pure zeolites yield only products with completely unsatisfactory strength, it is necessary to use a binder in the shaping that imparts to the shaped bodies adequate mechanical strength without also altering the desirable physical properties of the zeolite crystals.

According to German patent 1,165,562 it is known to prepare a thin suspension from molecular sieve zeolite and aqueous stable silicic acid sol which suspension is then converted to the gel state by magnesium oxide. If the gel formation occurs in an organic fluid that is immiscible with water, virtually spherical granulates can be obtained. After drying and activation at 400°C, according to conventional procedures, shaped bodies are obtained whose average hardness is only about 3.5 kp. This is substantially less mechanical resistance than is obtained by clay bound molecular sieve zeolites. Moreover, the gel shaped bodies that are formed are so delicate that in further processing, for example drying, activating and the like up to 30 percent of the spheres break. Also in order to carry out this sol-gel process special processing equipment is needed. For these reasons the granulates so prepared are suitable only for special application.

In the German patent 1,164,995, a process is described which uses as binder a stable silicic acid sol with a BET (Brunauer, Emmett, Teller) surface of 150 to 400 $m^2/g$ and a pH value of <9. According to this process the sol, by addition of a molecular sieve zeolite, which by slurrying in water yields a pH value of 8–11, is converted to a plastic mass. The plastic mass is then converted in a known process, for example extrusion, into shaped bodies and then dried and activated. While this process requies less expenditure in terms of apparatus than that described above, it does not yield a product that is satisfactory as to compression strength. The production of granular material occurs according to this process in two separate steps, that is the preparation of the paste and its subsequent shaping, for example with an extrusion press. During this process the stiffening of the silicic acid sol to a gel is supposed to be prevented, and this stiffening readily occurs in the mixing of zeolites and silicic acid sol because the zeolite takes up water, which leads to a localized enriching of the sol and, in combination with the strong electrolyte concentration evoked by the zeolites, then leads to gelling of the sol. The mixture of molecular sieve zeolite and silicic acid sol must be shaped after one hour at the latest, in order to obtain satisfactory products. In addition, during the granulation process, there must be no gelling. For this reason, this method additionally places special requirements as to purity and condition of the starting material. Also in order to successfully practice the invention, after leaving the granulation device, the added silicic acid must be in a form that allows it to convert the shaped bodies into a suspension by addition of small amounts of water. If this is not the case, that is to say if a gel is formed from the sol after drying, one obtains a granular material that has no strength whatsoever and disintegrates even when it is handled.

One may conclude that according to the known methods as described above, a stable mixture of silicic acid sol and molecular sieve is prepared and must be retained until the shaping is completed. If this is not the case, according to the teaching of German Patent No. 1,165,562, spheres can no longer be formed and according to the process of the German patent No. 1,164,995, it is no longer possible to form adequately hard granular materials. The disclosures of these two patents are incorporated herein by reference in order to facilitate the understanding of the present invention.

An object of the present invention is to provide a method that avoids the above indicated drawbacks of the patents described.

DETAILED DESCRIPTION OF THE INVENTION

We have now quite surprisingly found that improved mechanically resistant shaped bodies of powdered zeolite molecular sieve material with a water content that does not prevent trickling and with an average compression strength of more than 5 kp can be made using silicic acid gel as binder, if a molecular sieve zeolite and an unstable silicic acid sol, whose silicic acid particles have a BET surface of more than 150 $m^2/g$ and whose silicic acid content is more than 10 percent by weight, are concurrently applied to different regions on the rotating plate of a granulation device thereby avoiding the formation of a plastic mass containing silicic acid sol wherein the zeolite is sprayed in powdered form in the lower region of the plate and the silicic acid sol is sprayed in the region of maximum velocity of the shaped bodies rolling off the plate, and that finally the shaped bodies are dried and activated according to processing techniques. The silicic acid sol here can have a pH value of 4 to 9, and preferably a value of 5–8.

The process of the present invention allows production of very hard granular material without the need for complex apparatus for processing a thin suspension of molecular sieve zeolite and silicic acid sol, or the preparation of the granular material in two separate steps. While not wishing to be bound by any particular theories the surprising results achieved with the process seem to reside in the fact that immediately upon bringing together of the starting materials, a gel is formed from the sol into which the zeolite particles are forced. The thus-formed shaped bodies need not be converted to a suspension with addition of small quantities of water whereas the opposite is described when the shaped bodies produced according to German patent No. 1,164,995 after leaving the granulation device are stirred to a slurry with a little water. Another distinct difference between the present invention and the prior procedures is that in the known processes retention of the sol state is described as absolutely necessary to attain adequate hardness of the spheres; this is not necessary according to the process of the present invention. Thus all adjustments and measures used to maintain the sol state in prior processes are eliminated.

According to the present invention the zeolite particles are conveniently and simply sprayed on a granulation plate at the point of their maximum velocity with a silicic acid sol that has been previously set, for example to a pH between 4 and 9. In this way it is possible to prepare molecular sieve-shaped bodies in a single working step. As indicated the zeolite particles are applied to the granulation plate towards the lower region of the plate and the silicic acid sol is sprayed onto the plate in the region of maximum velocity of the shaped bodies rolling off the plate.

Best results are obtained if the silicic acid sol is dispensed in a mist form with use of a two component nozzle in the zone of maximum velocity of the shaped bodies rolling off the granulation plate. For formation of this mist, air or any other propellant gas is used, and, if the spraying of the sol is not sufficient, as may be in the case of some single component nozzles, spheres will be obtained that have a bowl-shaped structure. These bowl-shaped spheres consist of layers of silicic acid and molecular zoelite and are generally unacceptable for the resulting shaped bodies that have such a structure do not have sufficient mechanical strength after drying and are easily crumbled by hand.

The zeolites are also dispensed advantageously a state of fine subdivision on the granulation plate in its lower zone and we have found that dispensing the zeolite using quate subdivision. Finely divided distribution can be enhanced if a substance that improves the zeolite's rheological properties properties is added to the zeolite particles; an example is pyrogenic silicic acid and other such agents will be apparent to the skilled worker. The spraying is conveniently conducted at ambient temperatures.

As indicated above the silicic acid sol that is used has a BET surface area greater than 150 m$^2$/g and although in theory larger surface area materials may be used, as a practical matter surface areas greater than about 600 m$^2$/g are not employed. Similarly the silicic acid content of the sol is greater than 10 percent by weight, and usually of the order of about 25 to about 35 percent by weight. Although in theory a content as high as 50 weight percent may be used.

There are, of course, many types of zeolitic molecular seive materials that are useful in the process of the present invention and, as indicated above, the water content of the zeolitic material is such that it does not prevent trickling. Usually this value will be about 1 to about 20 weight percent of water. The zeolite molecular seive is used in a subdivided state having a particle size of the order $0.01\mu$ to $20\mu$ as described in the above-mentioned German Patent Nos. 1,165,562 and 1,164,995.

The invention will be further illustrated and explained by the following working examples in which all parts and percentages are by weight unless otherwise indicated.

EXAMPLE 1

An opalescent unstable sol with pH 5 is prepared from a commercial clear 30 percent silicic acid sol with a BET surface of 180 m$^2$/g by addition of hydrochloric acid. This sol is immediately sprayed in mist form using a 2-component nozzle onto a rotating granulation plate. At the same time a molecular sieve zeolite with a water content of 13 percent is sprayed in the lower zone of the same rotating plate by shaking trough through a fine sieve. The spherical shaped bodies that are thus formed from this procedure pass several times through a mist zone that is positioned in the zone of maximum velocity of the spheres, and as they pass through this mist zone they repeatedly take up silicic acid. For 10 kg of zeolite about 5 litres silicic acid sol is consumed. The granular material leaving the plate cannot be converted again to a suspension with water. Gel formation thus occurs during the granulation process.

After drying at 100°C and activation at 300°C, the spheres have an average strength of 6.9 kp and this value was determined with an instrument of Karl Frank Company and is an average value of 100 individual measurements. According to this test procedure the individual shaped bodies were slowly loaded to the disintegration point.

EXAMPLE 2

In a manner similar to Example 1 an unstable silicic acid sol was prepared having a pH value of 5 and allowed to cure for 3 hours at room temperature. Using the same procedures as above and using a zeolite that by drying at 250°C was adjusted to a water content of 3 percent, granular material was prepared. This material, after drying at 100°C and activation at 300°C, had an average compression strength of 6.6 kp tested in the same manner as in Example 1.

EXAMPLE 3

A silicic acid sol was brought to pH 8 and was worked up, as described in Example 1, to spheres on the granulation plate with a zeolite that had a water content of 18 percent and that had been rendered more flowable by the addition of 0.5 percent by weight pyrogenic silicic acid. For 11.4 kg molecular sieve zeolite 5.1 litres of 30 percent unstable sol was consumed. The shaped bodies that were obtained were cured for 12 hours at room temperature, and then dried at 110°C and finally activated at 300°C. The granular material had a hardness of 5.2 kp measured in the same manner as in Example 1.

Finally, the invention will be illustrated by the following description in conjunction with the drawing.

According to FIG. 1 the powdered zeolite molecular sieve material runs from container 1 onto a conveyor-belt 2 and is transported by this belt to a shaking-groove 3 which sprays the powder into the lower region 4 of the inclined pelletizing plate 5. Plate 5 is rotated by motor 6.

The silicic acid sol leaves container 7 and is charged by pump 8 to sprayer-nozzle 9, thereby passing dosage valve 10. Nozzle 9 sprays the silicic acid sol into the region of maximum velocity 10 of the shaped bodies rolling on the surface of the plate.

FIG. 2 shows the curve in which the body material is moving on the surface of the rotating pelletizing plate 5 for shaping.

We claim:

1. A process for producing shaped bodies of zeolitic molecular sieves of improved mechanical resistance having an average compression strength greater than 5 kp, composed of a pulverized zeolitic molecular sieve material having a water content that permits trickling and silicic acid gel as a binder for said sieve material, said process comprising concurrently dispersing an unstable silicic acid sol, having a silicic acid content greater than 10 percent by weight and a silicic acid particle BET surface greater than 150 m²/g, and said molecular sieve zeolite onto different regions of the rotating plate of a granulation apparatus, while at the same time avoiding the formation of a plastic mass containing silicic acid sol, wherein the zeolite in a powdered form is applied by spraying onto the lower zone of said plate and the unstable silicic acid sol is sprayed in a finely divided form onto said plate in the zone of maximum velocity of the shaped bodies rolling off of the plate, and the thus produced shaped bodies are thereafter dried and activated to have an average compression strength greater than 5 kp.

2. The process according to claim 1 wherein said unstable silicic acid sol has a pH of 4-9.

3. The process according to claim 2 wherein said unstable silicic acid sol has a pH of 5-8.

* * * * *